United States Patent [19]

Nunotani et al.

[11] Patent Number: 4,948,271
[45] Date of Patent: Aug. 14, 1990

[54] BEARING STRUCTURE WITH IMPROVED LUBRICATING SEALS FOR SUPPORTING SHAFT ELEMENT

[75] Inventors: Masao Nunotani; Masaaki Matsumoto, both of Osaka, Japan

[73] Assignee: Koyo Seiko Co., Ltd., Osaka, Japan

[21] Appl. No.: 436,789

[22] Filed: Nov. 15, 1989

Related U.S. Application Data

[62] Division of Ser. No. 301,941, Jan. 26, 1989, Pat. No. 4,919,551.

[30] Foreign Application Priority Data

Jan. 26, 1988 [JP] Japan ................................. 63-15586

[51] Int. Cl.$^5$ .............................................. F16C 33/78
[52] U.S. Cl. ..................................... 384/473; 384/482; 384/485; 384/571; 277/95
[58] Field of Search ............... 384/473, 482, 485, 571, 384/484; 277/95

[56] References Cited

U.S. PATENT DOCUMENTS 2,059,181 10/1936 Wilson .
2,945,730 7/1960 Murray et al. .
3,006,701 10/1961 Curtis .
3,858,950 1/1975 Otto .
4,605,318 8/1986 Kaiser .

Primary Examiner—Lenard A. Footland
Attorney, Agent, or Firm—Wenderoth, Lind & Ponack

[57] ABSTRACT

A tapered roller bearing having an inner ring and an outer ring, each respectively having a tapered race, a plurality of tapered rollers, a cage which retains the tapered rollers at an even interval in the circumferential direction and first and second seals. The first seal has a lip and main element, the main element having mounted on the small diameter end portion of the inner ring, and the lip being forced in the axial outward direction of the bearing against the outer ring, and separated from the outer ring when forced in the inward axial direction. The second seak has a lip and main element, the main element mounted on the large diameter end portion of the inner ring, and the lip forced in the axial inward direction of the bearing against the outer ring, and separated from the outer ring when forced in the axial outward direction. The lips of the first seal and second seal are moved and separated from the outer ring, thus creating a clearance, by a force acting in the same direction. Lubrication is accomplished by supplying lubricating oil to this bearing in the one direction, so that only the lubricating oil passes through the bearing and penetration of foreign matter contained in the lubricating oil to the bearing is prevented by the seals.

3 Claims, 3 Drawing Sheets

BEARING STRUCTURE WITH IMPROVED LUBRICATING SEALS FOR SUPPORTING SHAFT ELEMENT This is a divisional application of application Ser. No. 07/301,941, filed Jan 26, 1989, now U.S. Pat. No. 4,919,551.

BACKGROUND OF THE INVENTION

This invention relates to a bearing with improved lubrication seals and supporting a shaft element, the bearing being a tapered roller bearing which causes flow of lubricating oil supplied to the inside of a bearing in only one direction, and is able to prevent the penetration of foreign matter contained in the lubricating oil to the bearing.

Conventional tapered roller bearings used in the differential pinion shaft of an automobile are open bearings not provided with a seal, and lubricating oil inside the gear case is supplied to and lubricates the tapered roller bearing. However, the lubricating oil inside the gear case contains large quantities of iron filings and other foreign matter produced by contact and friction between the gears, said foreign matter penetrates the tapered roller bearing, and causes wear and damage to the bearings. Furthermore, because the bearing used in the differential pinion shaft is above the surface of the lubricating oil, when the viscosity of the oil is high as in cold regions or during sudden starts, seizing occurs or the bearing may be damaged because the lubricating oil reaches the bearing more than ten seconds after the shaft starts turning.

Thus, a shaft support device using a tapered roller bearing such as shown in FIG. 3 has been proposed (Japanese Patent Application Laid-Open No. 53-109049). This bearing support device is comprised of a gear case (housing) 1 which is filled with lubricating oil, a pinion shaft 5, and tapered roller bearing 6. Said tapered roller bearing 6 is sealed with seals 4 affixed to the inner race, and the inside of the bearing is filled with, for example, grease. Therefore, it is difficult for lubricating oil in gear case 1 to enter tapered roller bearing 6 filled with grease and sealed with the seals 4, and the bearing is not damaged by foreign matter in gear case 1. Furthermore, because the bearing is packed with grease, the bearing is not damaged in cold regions or in the case of sudden starts.

Nevertheless, the problem of bearing seizure and damage remains with the tapered roller bearing in the case in which the packed grease degrades and the bearing is not supplied with lubricant because the inside of the bearing sealed with seal 4 is packed with, for example, grease.

SUMMARY OF THE INVENTION

Therefore, the object of the present invention is to supply a bearing lubrication means which by circulating lubricating oil only in one direction can use, for example, lubricating oil inside the gear case as the lubricating oil for the bearings, and a tapered roller bearing which causes lubricating oil supplied to the inside of the bearing to flow in one direction only and which is able to prevent penetration of foreign matter contained in the lubricating oil into the bearing.

To achieve this object, a bearing lubrication means according to the present invention is characterized by a bearing lubrication means for bearings comprised of races consisting of an inner ring and outer ring, a plurality of rolling elements, a cage which retains these rolling elements, and a pair of seal members provided between the races, said seal members installed in such a manner that lips of the seal members contact one or the other of the races, and such that when said lips move in the one direction said lips separate from the race thus creating a clearance, and when said lips move in the other direction said lips are pressed against the race, said lubricating oil being supplied to the bearing in the one direction and in predetermined pressure such that only the lubricating oil passes through the bearing.

According to this means, because only lubricating oil circulates past the lip and through the bearing, penetration of foreign matter into the bearing is prevented, and only lubricating oil is circulated in one direction. Therefore, foreign matter can be removed even when lubricating oil containing foreign matter gets inside the gear case, and said lubricating oil can be used for bearing lubricating oil.

Furthermore, to achieve the object, a tapered roller bearing according to the present invention is characterized by an inner ring having a race surface comprised of a tapered face, an outer ring having a race surface comprised of a tapered face, a plurality of tapered rollers which roll on the race surface of the inner ring and the race surface of the outer ring, a cage which retains the tapered rollers at an even interval in a circumferential direction; a first seal which is comprised of a lip and a main element, said main element mounted on a small diameter end portion of the inner ring, said lip forced in an axial direction to the outside against the outer ring and separated from the outer ring when said lip is forced in the axial direction to the inside, and a second seal which is comprised of a lip and a main element, said main element mounted on a large diameter end portion of the inner ring, said lip forced in the axial direction to the inside against the outer ring and separated from the outer ring when said lip is forced in the axial direction to the outside.

According to this construction, lubricating oil supplied to the bearing from the outside flows in only one direction, and the penetration of foreign matter contained in the lubricating oil into the bearing can be prevented by the lip. Furthermore, because this tapered roller bearing can be assembled in such a manner that the lip of the seal can be forced to the inside by the tapered race of the outer ring and the lip can be separated from the race, the inner ring can be assembled in the outer ring without the seal interfering, and moreover because in this bearing the lip of the seal contacts the rolling surface of the outer ring, polishing and grinding of the slide surface can be eliminated. Therefore, low cost manufacture is easy.

It is preferred that the lips of the first seal and second seal be a thin sheet at the connection to each respective main element, thus reducing the elasticity of the lips. When so constructed, the flow of the lubricating oil is smoother, and the rotational torque of the bearing can be reduced.

BRIEF DESCRIPTION OF THE DRAWINGS

These and other objects and features of the present invention will become clear from the following description taken in conjunction with the accompanying drawings throughout which like parts are designated by like reference numerals, and in which.

DETAILED DESCRIPTION OF PREFERRED EMBODIMENTS

Figure 1:
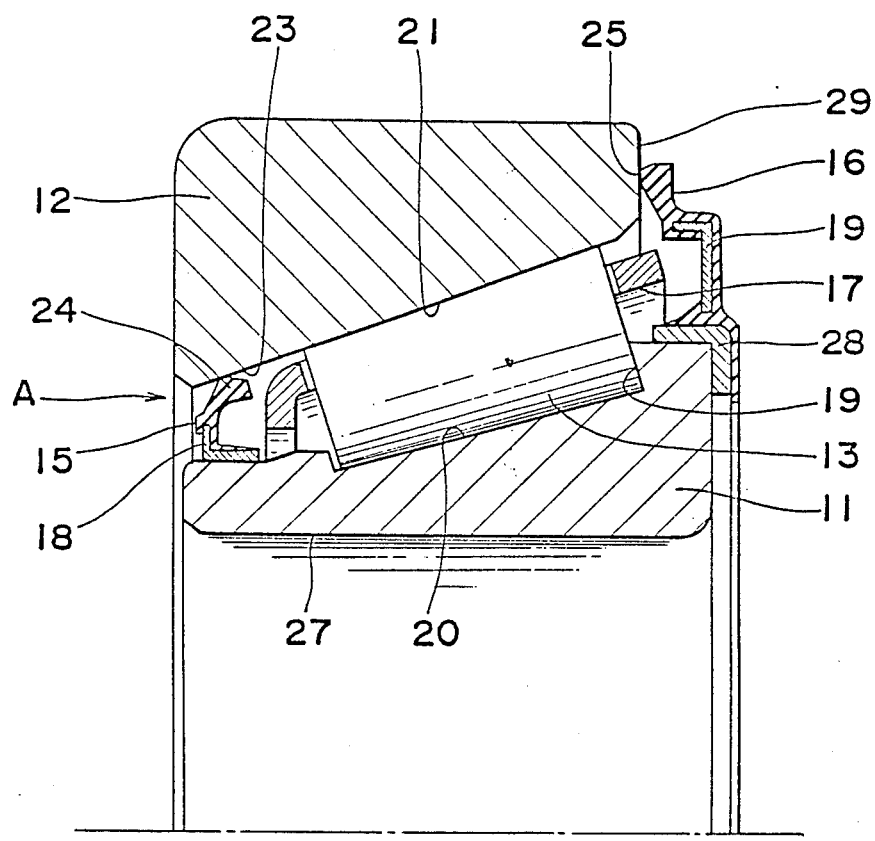
FIG. 1 is a cross section of the essential parts of a tapered roller bearing according to a first embodiment of the present invention.

FIG. 1 is a cross section of the essential parts of a tapered roller bearing according to a first embodiment of the present invention. Reference number 11 designates an inner ring 11, 12 designates an outer ring, 13 designates a tapered roller, 15 and 16 designate seals, and 17 designates a retainer.

The seal 15 is comprised of seal element 18 which includes an L-shaped core plate, and lip 24; element 18 is mounted on the outer circumference of the small diameter end of inner ring 11; lip 24 has a thin cross-section where it is fitted on the element 18 which reduces the elasticity of the lip. The lip is urged by its electricity in the axial outward direction (left in the figure) against and the narrow face slides in contact with end portion 23 of race 21 of outer ring 12. Therefore, when lip 24 is forced in the opposite direction, i.e., to the inside in the axial inward direction, lip 24 separates easily from end portion 23. Hereinafter, that portion of race 21 against which lip 24 slides shall be referred to as slide face 23. In this manner, because lip 24 slides while being urged axially outwardly of the bearing against slide face 23, lubricating oil supplied from the outside of the bearing toward the inside as shown by arrow A opens lip 24 slightly axially inwardly and is thus able to flow into the bearing. However, when the flow of lubricating oil in the direction of arrow A stops and lubricating oil inside the bearing is forced to flow in the direction opposite that of arrow A, lip 24 is pressed against slide face 23 by the force of its own elasticity and oil pressure, and the lubricating oil is not able to flow back. Furthermore, in the case in which, for example, lubricating oil inside the gear case is used as the lubricating oil, large size foreign matter contained in the lubricating oil is obstructed by seal 15, and is not able to penetrate inside the bearing.

On the other hand, seal 16 is comprised of lip 25 and stiffening element 19 which includes an L-shaped core plate, and is mounted on the circumference of L-shaped annular slip supporting member 28 which is mounted on the outer end portion of the large diameter side of inner ring 11. Also, lip 25 of seal 16 has a reduced cross-section where it is mounted on the supporting element 19 which reduces the elasticity of the lip. The lip is urged axially inwardly (left in the figure), and slides in contact with slide face 29 which is provided on the side of the end portion of the large inner diameter end of outer ring 12. Therefore, lubricating oil which is supplied from outside the bearing at predetermined pressure in the direction of arrow A, passes seal 15 and flows to the bearing can press lip 25 urge it axially outwardly away from face 29 and flow out from the bearing. However, when the flow of lubricating oil stops, lip 25 is pressed against slide face 29 by the force of its own elasticity, and inflow of lubricating oil past lip 25 is prevented.

In this manner, because a tapered roller bearing according to the present invention is provided with seals 15, 16 having lips 24, 25 forced against and sliding in contact with slide faces 23, 29 in axially outward and axially inward directions, respectively, lubricating oil supplied into the bearing from the outside can flow in one direction only, and the penetration of foreign matter contained in the lubricating oil into the bearing can be prevented by the seals 15, 16.

Furthermore, because the slide face 23 against which lip 24 slides is race 21 of outer ring 12, special polishing or grinding for a seal is not required on slide face 23 during bearing manufacture. Therefore, part of the production process can be eliminated and costs can be reduced. Moreover, because this bearing is a tapered roller bearing, and is so designed that seals 15, 16 slide against slide faces 23, 29 to the left in the figure (toward the small diameter side of race 21), the pressing direction and the installation direction of lips 14, 15 with respect to the outer ring are the same. Therefore, when inner ring 11 to which is fitted rolling element 13 and seals 15, 16 are assembled into outer ring 12, assembly can be easily completed without interference from seals 15, 16. Moreover, because the connection of main elements 18, 19 of seals 15, 16 to lips 24, 25 is a thin sheet which reduces the elasticity of the seals, lubricating oil flow is smooth, and the rotational torque of the bearing can be reduced.

In a preferred embodiment according to the present invention, seal 16 is so designed as to slide against slide face 29 provided on the outer end portion of outer ring 12, but it may also be provided similarly to seal 15, i.e. to slide against race 21.

Figure 2:
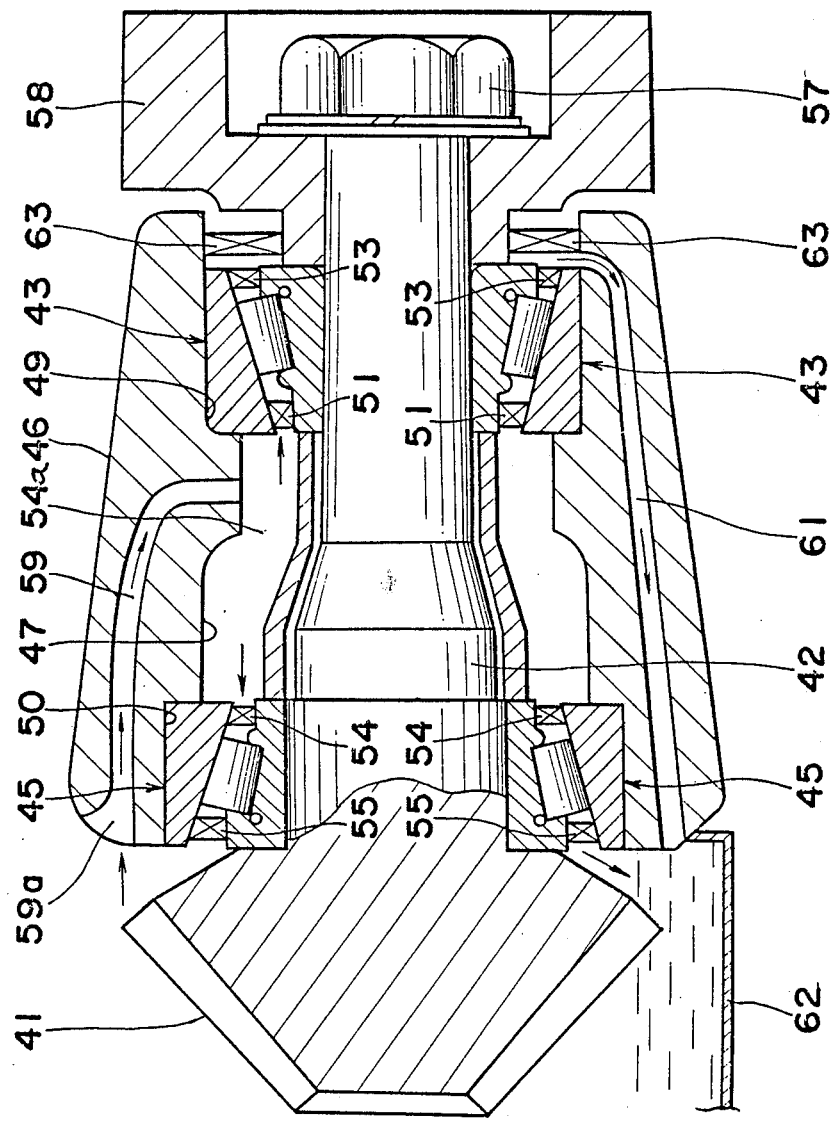
FIG. 2 is a cross section of a differential pinion shaft bearing using a tapered roller bearing as shown in FIG. 1.
Figure 3:
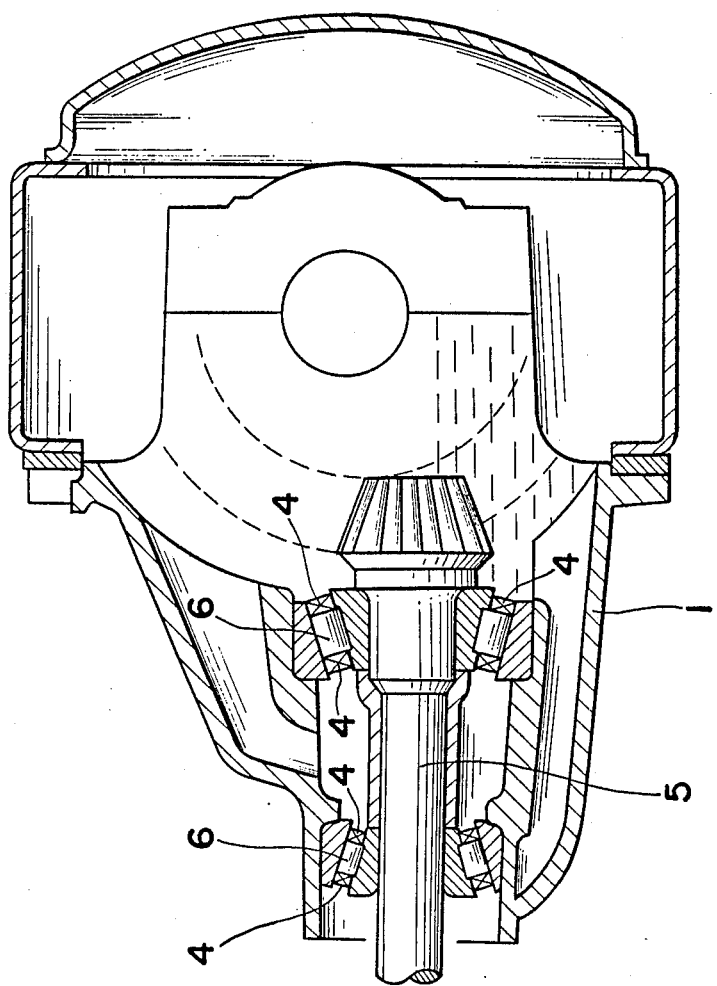
FIG. 3 is a cross section of a shaft support device using a conventional tapered roller bearing.

FIG. 2 is a cross section of a bearing for the automobile differential pinion shaft using the tapered roller bearing shown in FIG. 1. Reference number 41 designates a differential pinion, 42 designates a differential pinion shaft, 43 designates a tapered roller bearing (hereinafter referred to as the front bearing) which supports the front end of differential pinion shaft 42, and 45 designates a tapered roller bearing (hereinafter referred to as the rear bearing) which supports the rear end of differential pinion shaft 42.

The front bearing 43 and rear bearing 45 are fit into shoulder 49 and shoulder 50 of shaft hole 47 provided in the center of housing 46. Front bearing 43 and rear bearing 45 have the same construction as the tapered roller bearing shown in FIG. 1. Seals 51, 53 and seals 54, 55 are so comprised that lubricating oil supplied from chamber 54a formed when shaft hole 47 is closed by front bearing 43 and rear bearing 45 can flow outwardly of chamber 54a. A thread is provided on the end of differential pinion shaft 42 opposite the differential pinion 41, and differential pinion shaft 42 is mounted on member 58 by nut 57. Also, differential pinion shaft 42 is secured in such a manner by differential pinion 41 and nut 57 that it does not move axially with respect to front bearing 43 and rear bearing 45.

A passage 59 is provided from the side of differential pinion 41 of housing 46 to chamber 54a in the top portion of the housing 46. Additionally, a passage 61 is provided in the bottom portion of housing 46 from the outside of front bearing 43 to the side of differential pinion 41. Seal 63 is provided to prevent the entrance of water and mud from the outside.

In the present embodiment, differential pinion 41 is immersed in the lubricating oil inside gear case 62.

A more detailed description of the lubricating action inside a bearing of the construction follows.

When differential pinion 41 rotates, the lubricating oil inside gear case 62 is sprayed by the teeth of differential pinion 41, and is supplied to entrance 59a of the passage 59. Lubricating oil supplied to entrance 59a of passage 59 passes through passage 59 and inflows to chamber 54a. The lubricating oil inflowed to chamber 54a and having a pressure passes seals 51, 54 and enters front bearing 43 and rear bearing 45, thus lubricating front bearing 43 and rear bearing 45, and then outflows past seals 53, 55. In the case of the front bearing, lubricating oil outflowed flows through passage 61 and is recovered in gear case 62.

In this manner, according to the present invention, lubricating oil supplied to entrance 59a of passage 59 from gear case 62 circulates by the action of seals 51, 53 and seals 54, 55 in one direction (from seal 51 to seal 53, and from seal 54 to seal 55), and is recovered in gear case 62. At this time, if, for example, the rotation of differential pinion 41 has stopped and the flow of lubricating oil has stopped, lubricating oil is retained temporarily inside bearings 43, 45 by the closing of seals 51, 53 and seals 54, 55. Therefore, when the lubricating oil viscosity is high in cold regions or in the case of sudden starts, the retained lubricating oil can provide initial lubrication, lubricating oil can be stably supplied to front bearing 43 and rear bearing 45, and the bearings can be protected. Furthermore, penetration of iron filings and other foreign matter contained in the lubricating oil inside the gear case 62 to front bearing 43 and rear bearing 45 is prevented by seals 51, 53 and seals 54, 55, and damage to the bearings can be prevented.

In the present embodiment of the bearing lubrication means, tapered roller bearings are used for the front bearing and the rear bearing, but the present invention is not thus restricted. Specifically, any bearing provided with an inner ring, outer ring, rolling element, and seal having a lip of the type which can open in one direction only and is positioned on both sides of the rolling element, and so constructed that lubricating oil circulates in only one direction inside the bearing may be used.

In a preferred embodiment of the bearing lubrication means according to the present invention, initial grease may also be previously packed between seal 51 and seal 53 of front bearing 43. In this case, when the initial grease disappears, lubricating oil inside gear case 62 is supplied to the front bearing.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A bearing structure for supporting a shaft element, comprising:

a housing having a forward end and a rear end and a hollow interior;

a forward rolling element bearing at the forward end of said housing and a rear rolling element bearing at the rear end of said housing for supporting a shaft element within said housing between said bearings, each of said bearings being constituted by an inner ring having a race surface, and outer ring having a race surface, a plurality of rolling elements which roll on the race surface of said inner ring and the race surface of said outer ring, a cage which retains said rolling elements at even intervals in the circumferential direction of said bearing, a first seal having a lip portion and a supporting portion with said supporting portion mounted on one of said rings at one axial end of said bearing with said lip portion resiliently engaging a sealing surface on the other of said rings at said one axial end of said bearing in a direction axially outwardly of said bearing and movable axially inwardly to be separated from said sealing surface by pressure of a lubricating oil axially inwardly of said bearing, and a second seal having a further lip portion and a further supporting portion with said further supporting portion mounted on one of said rings at the other axial end of said bearing and with said further lip portion resiliently engaging a sealing surface on the other of said rings at the other axial end of said bearing in a direction axially inwardly of said bearing and movable axially outwardly to be separated from said further sealing surface by pressure of a lubricating oil axially outwardly of said bearing, said bearings each having said one axial end facing toward the interior of said housing and having said other axial end facing outwardly of said housing;

a lubricating oil reservoir outside of one end of said housing;

said housing having an oil drainage passage extending from just beneath the bearing at the other end of said housing to said oil reservoir and having an oil supply passage from said oil reservoir into the hollow interior of said housing between said bearings.

2. A bearing structure as claimed in claim 1 in which said lubricating oil reservoir is at a lower level than the bottom of said bearing at the other end of said housing, and said oil drainage passage slopes downwardly into said oil reservoir.

3. A bearing structure as claimed in claim 2 in which said oil supply passage extends from above the top of said bearing at the one end of said housing into said housing, and said bearing structure further comprising a shaft rotatably supported in said bearings and having thereon a rotating element in said oil reservoir for, when said shaft is rotated, lifting lubricating oil from the lower part of said reservoir into said oil supply passage.

* * * * *